United States Patent
Whitehurst et al.

(10) Patent No.: US 10,161,174 B2
(45) Date of Patent: Dec. 25, 2018

(54) VEHICLE HAVING A BRAKED SLIDING DOOR

(71) Applicant: FORD GLOBAL TECHNOLOGIES, LLC, Dearborn, MI (US)

(72) Inventors: Jack Whitehurst, Hockley (GB); Brian Westgarth, Billericay (GB); Rob Swann, Rayleigh (GB); Ian Patterson, Billericay (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/497,854

(22) Filed: Apr. 26, 2017

(65) Prior Publication Data

US 2017/0342755 A1 Nov. 30, 2017

(30) Foreign Application Priority Data

May 27, 2016 (GB) .................................. 1609376.7

(51) Int. Cl.
| | |
|---|---|
| E05F 5/00 | (2017.01) |
| E05D 15/10 | (2006.01) |
| E05C 17/60 | (2006.01) |
| B60J 5/06 | (2006.01) |

(52) U.S. Cl.
CPC .................. *E05F 5/003* (2013.01); *B60J 5/06* (2013.01); *E05D 13/04* (2013.01); *E05D 15/1047* (2013.01); *E05D 2015/1026* (2013.01); *E05D 2015/1055* (2013.01); *E05D 2015/1057* (2013.01); *E05Y 2201/21* (2013.01); *E05Y 2201/232* (2013.01); *E05Y 2201/26* (2013.01); *E05Y 2201/266* (2013.01); *E05Y 2900/531* (2013.01)

(58) Field of Classification Search
CPC ....................................................... E05F 5/003
USPC ....................................... 296/155; 16/82, 83
See application file for complete search history.

(56) References Cited

U.S. PATENT DOCUMENTS

| | | |
|---|---|---|
| 7,267,391 B2 | 9/2007 | Yokomori |
| 7,977,903 B2 | 7/2011 | Kamiya |
| 2005/0161973 A1 | 7/2005 | Yokomori |

(Continued)

FOREIGN PATENT DOCUMENTS

| | | |
|---|---|---|
| DE | 102011115419 A1 | 4/2013 |
| FR | 2937996 A1 | 5/2010 |
| JP | 10212867 A | 8/1998 |

(Continued)

OTHER PUBLICATIONS

English Machine Translation of DE102011115419A1.

(Continued)

*Primary Examiner* — Dennis H Pedder
(74) *Attorney, Agent, or Firm* — Vichit Chea; King & Schickli, PLLC

(57) ABSTRACT

A vehicle has a sliding door fitted with a rotatable brake member to apply a braking force to the sliding door when the vehicle is on a slope. The brake member is automatically rotated about a pivot axis X-X by a moveable member forming part of an actuator when the vehicle is resting on a slope into a position in which a braking force is applied to the sliding door by the interaction of the brake member with an elongate track in the form of a sliding door support track.

15 Claims, 6 Drawing Sheets

(56) References Cited

U.S. PATENT DOCUMENTS

2006/0131111 A1* 6/2006 Nakanishi ................ E05F 1/16
 188/67

FOREIGN PATENT DOCUMENTS

| JP | 10246061 A | 9/1998 |
|---|---|---|
| JP | 10317793 A | 12/1998 |
| JP | 2003118375 A | 4/2003 |
| JP | 2004003350 A | 1/2004 |
| JP | 2016056626 A | 4/2016 |
| JP | 2016079746 A | 5/2016 |

OTHER PUBLICATIONS

English Machine Translation of FR2937996A1.
English Machine Translation of JP10212867A.
English Machine Translation of JP10246061A.
English Machine Translation of JP10317793A.
English Machine Translation of JP2003118375A.
English Machine Translation of JP2004003350A.
English Machine Translation of JP2016056626A.
English Machine Translation of JP2016079746A.

* cited by examiner

VEHICLE HAVING A BRAKED SLIDING DOOR

TECHNICAL FIELD

This document relates to a motor vehicle having a sliding door and, in particular, to a brake mechanism arranged to provide a braking force to the sliding door when the motor vehicle to which the sliding door is slidingly connected rests upon a slope.

BACKGROUND

It is known to provide a motor vehicle with a sliding door to permit entry to and exit from a motor vehicle. In the case of a manually operated sliding door the opening and closing forces applied to the door due to gravity when the vehicle rests upon a slope can be considerable. Such gravity forces can produce excessive relative velocity between the sliding door and the structure of the motor vehicle when the slope is steep that can cause damage to components associated with the sliding door such as tracks, rollers, bump-stops when an end limit of door movement is reached.

Such damage can be costly and time consuming to repair and often requires expensive bump stops to be provided to reduce the risk of damage from occurring.

FIGS. 1a to 1c show a motor vehicle 110 having a left hand side rear opening door 112 in three positions and the direction in which a force resulting from the angle of the slope upon which the motor vehicle rests act upon the sliding door.

In FIG. 1a the motor vehicle 110 is resting upon a surface a' that is horizontally disposed such that a longitudinal axis H-H of the motor vehicle 110 is disposed horizontally and an upright axis v-v of the motor vehicle 110 is disposed vertically. The sliding door 112 is shown in a closed position and is moveable between respective closed and open positions as indicated by the double arrow C-O. Movement of the sliding door 112 in a closing direction is indicated on FIG. 1a by "C" and movement of the sliding door 112 in an opening direction is indicated on FIG. 1a by "O" and movement between the two positions "O" and "C" is guided by tracks that are disposed horizontally when the motor vehicle 110 is resting on a horizontal surface. It will be appreciated that when the motor vehicle 110 is resting on a horizontal surface no force due to the effect of gravity will affect either closing or opening of the sliding door 112 because such a gravity force will act vertically in a downward direction pushing the sliding door onto the tracks.

In FIG. 1b the motor vehicle 110 is shown resting on a slope referred to herein as a 'decline'. That is to say, on a slope where a front end of the motor vehicle 110 is lower than a rear end of the motor vehicle 110. The magnitude of the decline is indicated by the angle θ of the surface 'R' on FIG. 1b. A force due to gravity or 'gravity force' acts upon the sliding door 112 in the direction of the arrow F due to the inclined orientation of the motor vehicle and the tracks used to support the sliding door 112. The effect of this gravity force is to urge the sliding door 112 in the door closing direction thereby producing undesirable acceleration and relative velocity of the sliding door 112 if the decline is a steep one. The magnitude of the force "F" is equal to mg sin θ. Where m is equal to the mass in kg of the sliding door 112, g is equal to 9.81 m/s2 and θ is the angular orientation of the surface 'R' to horizontal.

In FIG. 1c the motor vehicle 110 is shown resting on a slope referred to herein as an 'incline'. That is to say on a slope where a front end of the motor vehicle 110 is higher than a rear end of the motor vehicle 110. The magnitude of the incline is indicated by the angle Φ on FIG. 1c. The gravity force acting upon the sliding door 112 is in the direction of the arrow f. The effect of this gravity force is to urge the sliding door 112 in a door opening direction thereby producing undesirable acceleration and relative velocity of the sliding door 112 if the incline is a steep one. The magnitude of the force "f" is equal to mg sin Φ. Where m is equal to the mass in kg of the sliding door 112, 'g' is equal to 9.81 m/s2 and Φ is the angular orientation of the surface 'R' to horizontal.

Therefore, in summary, whenever a vehicle is resting on a slope in which the orientation of the motor vehicle is non-horizontal a gravity force will act upon a sliding door biasing the sliding door either open or closed depending upon the orientation of the slope. The application of this gravity force upon the sliding door can result in unwanted and potentially damaging sliding door speed if the orientation of the slope produces a gravity force in the same direction as the direction in which the door is being moved.

It is an object of this disclosure to provide a vehicle with a sliding door having a simple and economical to manufacture brake mechanism to reduce the relative velocity between the sliding door and the body structure of the vehicle when the sliding door is moved while the vehicle is resting on a slope.

According to the disclosure there is provided a vehicle having an elongate track extending longitudinally along a side of the motor vehicle, a sliding door manually slideable between closed and open positions and a sliding door brake mechanism for selectively applying a braking force to the sliding door. The sliding door brake mechanism comprises a brake member pivotally connected to the sliding door of the vehicle for rotation about a pivot axis and having a brake surface located between the pivot axis of the brake member and the adjacent elongate track. The brake member is rotatable about the pivot axis between a neutral position in which there is no contact between the brake surface and the adjacent elongate track and an engaged position in which the brake surface abuts against the adjacent elongate track so as to provide a braking force to the sliding door. When the vehicle is on a slope, the non-horizontal orientation of the vehicle due to the slope upon which it rests causes the brake member to be automatically engaged thereby providing the braking force to the sliding door.

The brake member may comprise a pair of spaced apart brake surfaces located on opposite sides of a plane aligned with and extending from the pivot axis to the elongate track.

There may be a first brake surface positioned between the plane and a rear end of the sliding door and the first brake surface may be automatically brought into engagement with the elongate track when the vehicle is on an incline.

The braking force produced by the engagement of the first brake surface with the elongate track may produce a self-servo effect when the sliding door is moved in a door opening direction while the vehicle is on the incline.

There may be a second brake surface positioned between the plane and a front end of the sliding door and the second brake surface may be automatically brought into engagement with the elongate track when the vehicle is on a decline.

The braking force produced by the engagement of the second brake surface with the elongate track may produce a self-servo effect when the sliding door is moved in a door closing direction while the vehicle is on the decline.

The brake member may include an actuator having a moveable component the position of which is dependent upon the orientation of the vehicle. The moveable member may be spaced away from the pivot axis of the brake member on an opposite side of the pivot axis to the position of the or each brake surface so that movement of the moveable component provides a force to the brake member to cause the brake member to rotate about the pivot axis in a direction corresponding to the orientation of the vehicle.

The actuator may have a body defining a cavity and the moveable component may be one of a ball and a roller held captive in the cavity in the body of the actuator.

The body of the actuator may be formed as a unitary part of the brake member.

Preferably, the elongate track may be a sliding door support track extending longitudinally along a side of the motor vehicle and the sliding door may be manually moveable along the sliding door support track between the closed and open positions.

The brake member may be pivotally connected to the sliding door via a carrier forming part of a sliding door support mechanism.

The sliding door support mechanism may further comprise one or more wheels rotatably connected to the carrier for engaging the sliding door support track and the brake member may be positioned such that a portion of the sliding door support track is interposed between the brake member and one or more of the wheels.

Each brake surface may be formed on a brake portion of the brake member and each brake portion may be formed as a unitary part of the brake member.

The pivot axis of the brake member may be arranged substantially vertically when the vehicle rests upon a level horizontal surface.

The direction in which the brake member rotates when the vehicle is on the slope is related to the direction in which the pivot axis is displaced from the vertical due to the vehicle resting on the slope.

BRIEF DESCRIPTION OF THE DRAWING FIGURES

The vehicle will now be described by way of example with reference to the accompanying drawing of which:

FIG. 4b is a scrap cross-section in the direction of the arrow "V" on FIG. 4a through an actuator forming part of the brake member shown in FIGS. 3a, 3b and 4a;

DETAILED DESCRIPTION

Figure 1A:
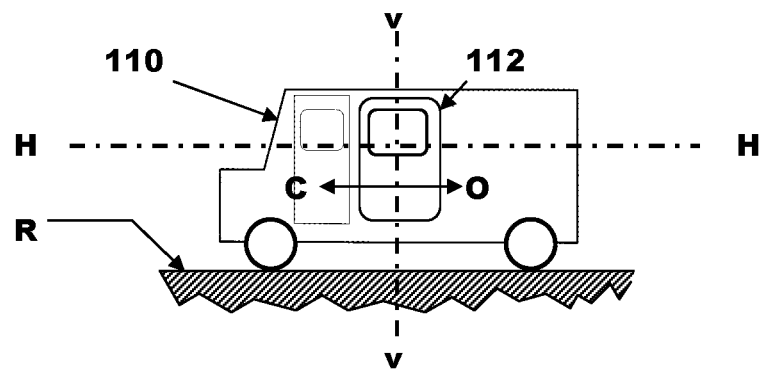
FIG. 1a is a diagrammatic left-hand side view showing a motor vehicle stationary on a level horizontal surface with a left-hand side sliding door in a closed position.
Figure 1B:
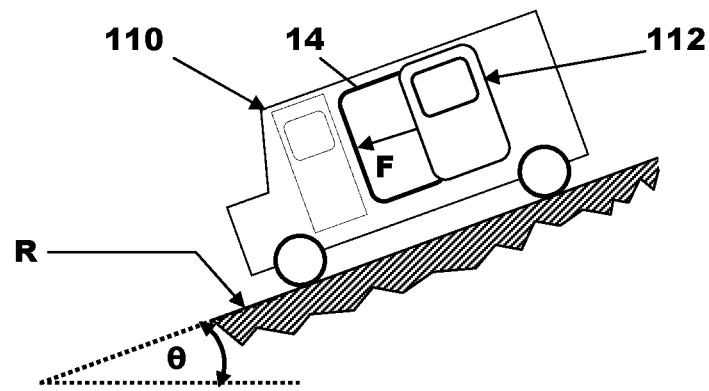
FIG. 1b is a diagrammatic side view similar to FIG. 1a showing the motor vehicle stationary on a decline with the left-hand side sliding door in an open position.
Figure 1C:
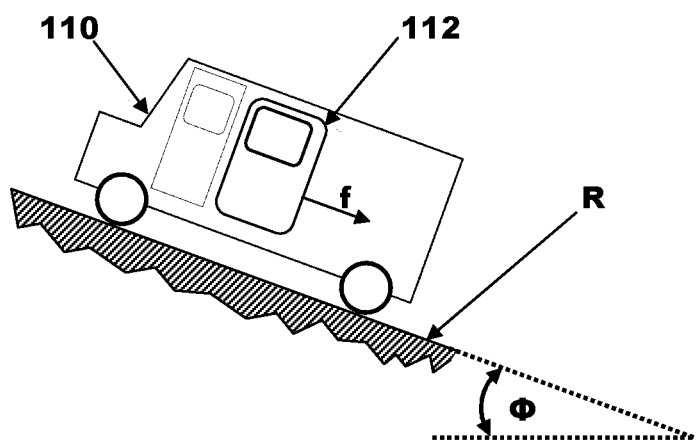
FIG. 1c is a diagrammatic side view similar to FIG. 1a showing the motor vehicle stationary on an incline with the left-hand side sliding door in a closed position.
Figure 2:
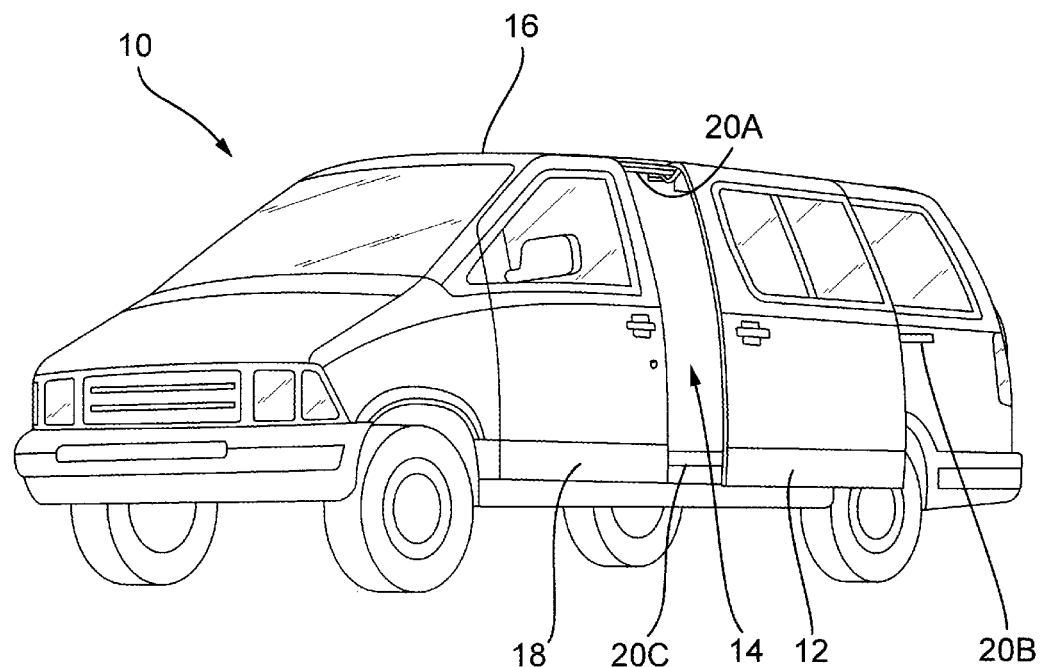
FIG. 2 is a pictorial representation of a motor vehicle having a sliding door with the sliding door shown in a partially open position.

With reference to FIG. 2, there is shown a motor vehicle 10 having a pair of manually operable sliding doors of which a left-hand side sliding door 12 is shown in FIG. 2.

The sliding door 12 is arranged on a side of the motor vehicle 10 and is moveable from a forward or closed position to a rearward or open position and is shown in a partially open position in FIG. 2. The sliding door 12 is therefore a rearward opening sliding door.

The sliding door 12 has a top end and a bottom end and is arranged to cover an aperture 14 in a body structure 16 of the motor vehicle 10 when it is in the closed position and allow access to a passenger compartment or cargo compartment of the vehicle 10 when in the open position. The sliding door 12 is provided in addition to other doors of the vehicle, such as a pair of pivotably openable front doors of which a left hand side front door 18 is shown in FIG. 2. It will be appreciated that one or more rear doors may also be present on the motor vehicle 10 to provide rear access to the passenger and/or cargo compartment.

As is well known in the art, the body structure 16 of the motor vehicle 10 has one or more sliding door support tracks in the form of three guide tracks 20A, 20B and 20C attached thereto to support and guide the sliding door 12 during opening and closing of the sliding door 12. Each of the guide tracks 20A, 20B and 20C extends along a side of the motor vehicle 10 and is disposed horizontally when the motor vehicle 10 is resting upon a level horizontal surface.

In the case of this example, a first guide track 20A is mounted on the motor vehicle body structure 16 so as to be located adjacent to the top end of the door 12, a second guide track 20B is provided at an intermediate point between the top and bottom ends of the sliding door 12 and a third guide track 20C is mounted on the body structure 16 so as to be positioned adjacent the bottom of the sliding door 12.

Although three guide tracks 20A, 20B and 20C are shown, it will be appreciated that any number of guide tracks may be provided and that they may be positioned at other locations than those shown in FIG. 2.

The guide tracks 20A, 20B and 20C guide the sliding door 12 such that the direction of its motion replicates that of the surface upon which the motor vehicle 10 rests. That is to say, when the motor vehicle 10 is resting upon a horizontal surface the movement of the sliding door will also be horizontal and if the motor vehicle 10 is resting upon a 10 degree incline the motion of the sliding door 12 will also be inclined at 10 degrees so that motion of the sliding door 12 towards the front of the motor vehicle 10 will be up a slope of 10 degrees and vice-versa.

Figure 3A:
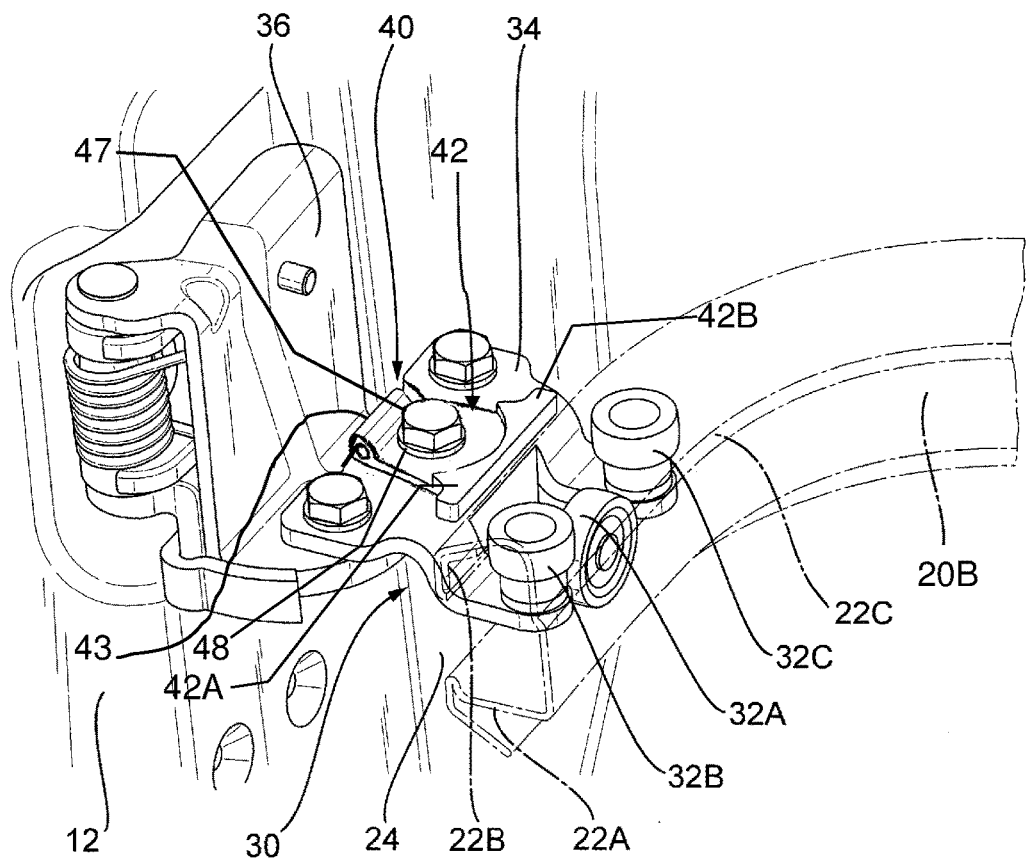
FIG. 3a is a perspective view of part of a sliding door support mechanism for slidingly supporting the sliding door showing a brake member forming part of a brake mechanism in a neutral position.
Figure 3B:
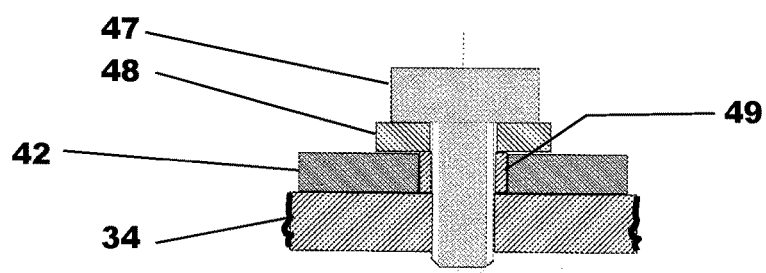
FIG. 3b is a scrap cross-section on a larger scale through a bolt, the brake member and part of a sliding door support mechanism to which the brake member is rotatably connected via the bolt.
Figure 4A:
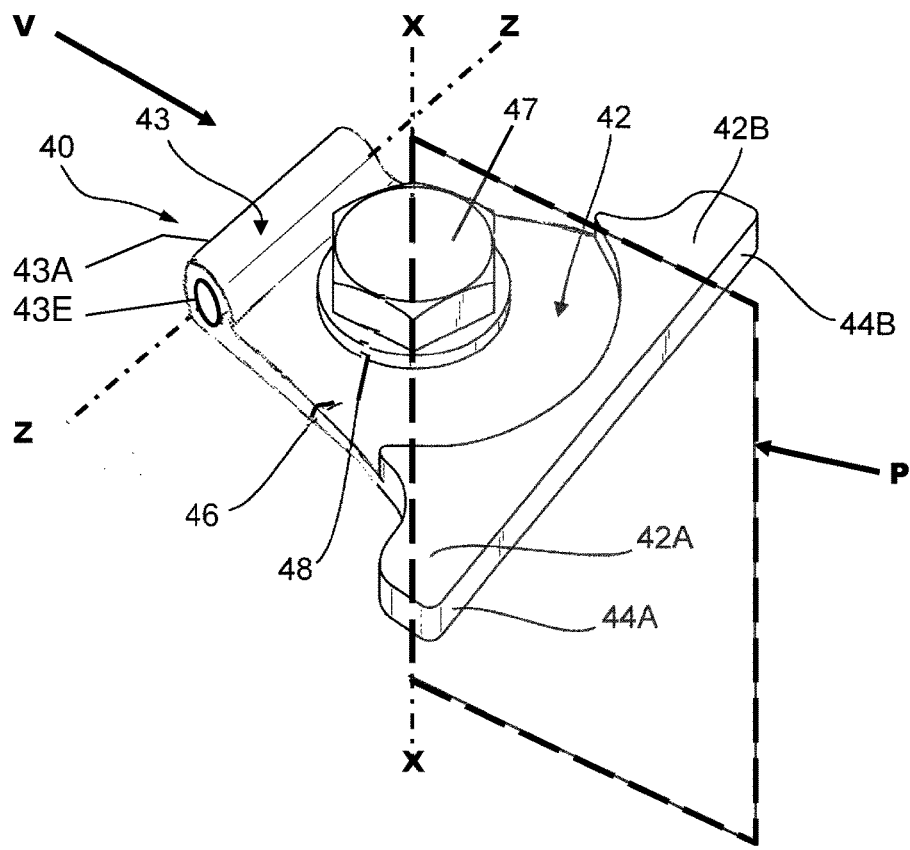
FIG. 4a is a perspective view on an enlarged scale of the brake member forming part of the brake mechanism shown in FIGS. 3a and 3b.

Referring now to FIG. 3a, a front part of the guide track 20B is shown on an enlarged scale. A sliding door support mechanism 30, which is connected to the sliding door 12, engages the track 20B so as to permit the sliding door 12 to slide relative to the track 20B. The sliding door support mechanism 30 comprises a carrier 34 connected to the sliding door 12 via an intermediate member 36, which in the case of this example is rotatably connected to the sliding door 12 and a number of wheels or rollers 32A, 32B and 32C rotatably supported by the carrier 34 and arranged to co-operate with the guide track 20B.

It will be appreciated that the sliding door support mechanism 30 and the guide track 20B cooperate to guide the sliding door 12 not only forwardly and rearwardly, but also to move the door outwardly from the door aperture 14 when opening commences and inwardly at the end of a closing operation. Accordingly, the guide track 20B is curved at one end, as shown in FIG. 3a.

The guide track 20B is in this case in the form of a metal channel that receives one or more wheels or rollers 32A, 32B and 32C which form part of the sliding door support mechanism 30.

A first wheel 32A rotates about a substantially horizontal axis and travels along a bottom wall 22A of the guide track 20B whereas the second and third wheels 32B and 32C rotate about respective substantially vertical axes and engage with side walls 22B and 22C respectively of the track 20B.

With particular reference to FIGS. 3a, 3b, 4a and 4b there is shown a sliding door brake mechanism 40, which is configured to automatically apply a braking force resisting movement of the sliding door 12 when the motor vehicle 10 is resting on a non-horizontal surface such as an incline or a decline.

The brake mechanism 40 comprises a brake member 42, an actuator 43, a fixing bolt 47 to pivotally connect the brake member to the carrier 34, a spacer tube 49 and a washer 48.

The brake member 42 is rotatable from a neutral position, in which the brake member 42 does not contact the track 20B, to one of a pair of engaged positions, in which the brake member 42 contacts the track 20B. Although in the case of this example the brake member 42 is arranged for co-operation with the guide track 20B it would be possible to use one of the other guide tracks 20A, 20C as the co-operating component for the brake member 42 or provide more than one brake members. For example, there could be a top brake member for co-operating with the top guide track 20A, the brake member co-operating with the guide track 20B and a bottom brake member for co-operation with the bottom track 20C.

The brake member 42 is rotatably coupled to the carrier 34 via the bolt 47 (See FIG. 3b) so as to facilitate free rotation of the brake member 42 between the neutral and engaged positions. The bolt 47 passes with minimal clearance through a spacer tube 49. The spacer tube 49 is provided to prevent the bolt 47 from clamping the brake member 42 to the carrier 34. The spacer tube 49 is slightly longer in length than the thickness of the brake member 42 at the location where the bolt 47 passes through an aperture in the brake member 42. The washer 48 is interposed between a head of the bolt 47 and one end of the spacer tube 49. It will be appreciated that one or more thrust washers or bearings could be used if required between the brake member 42 and the components used to secure it so as to reduce friction therebetween.

The actuator 43 acts on the brake member 42 and serves to rotate the brake member 42 towards one of the engaged positions when the motor vehicle 10 is resting an incline or decline.

The brake member 42 rotates about a pivot axis X-X that is arranged vertically when the motor vehicle 10 rests on a level horizontal surface. The bolt 47 and the spacer tube 49 define in combination the position of the pivot axis X-X for the brake member 42 (see FIG. 4b). The brake member 42 is in the case of this example a substantially planar member, e.g. flat and lies in a substantially horizontal plane when the motor vehicle 10 is resting on a horizontal surface.

The brake member 42 has first and second brake portions 42A, 42B disposed either side of the pivot axis X-X. That is to say, the first and second brake portions 42A, 42B are disposed either side of a plane "P" that passes through the pivot axis X-X so as to be aligned therewith and extends to the guide track 20B (see FIG. 4a). In some embodiments the plane "P" is arranged at ninety degrees to the guide track 20B. The first brake portion 42A is positioned between the plane "P" and a rear end of the sliding door 12 and the second brake portion 42B is positioned between the plane "P" and a front end of the sliding door 12. This arrangement ensures that the first brake portion 42A leads the pivot axis X-X when the door 12 is being opened and the second brake portion 42B leads the pivot axis X-X when the door 12 is being closed.

Each of the first and second brake portions 42A and 42B has a respective brake surface 44A, 44B that in use can engage the track 20B to provide a braking effect to the sliding door 12.

The brake surfaces 44A, 44B form in the case of this example part of a continuous end surface of the brake member 42 that is arranged substantially parallel to a surface of the track 20B when the brake member 42 is in the neutral position. In alternative arrangements, the brake surfaces may be curved and may not be formed as part of a single continuous surface but as separate surfaces extending from the brake member 42.

The brake surfaces 44A, 44B can be provided with a material or surface finish to increase friction between the brake member 42 and the track 20B. For example, the brake surfaces 44A, 44B may be coated or over moulded with an elastomer, rubber or other such high friction material. The use of such a coating has the advantage that noise generated by rattling of the brake member 42 when the motor vehicle 10 is in motion is attenuated.

The first and second brake portions 42A, 42B are connected to a central portion 46 of the brake member 42 having the aperture through which the bolt 47 and spacer tube 49 extend. As previously referred to the brake member 42 is held in place by the bolt 47 but is free to rotate relative to the carrier 34 about the pivot axis X-X.

The central portion 46 and the brake portions 42A, 42B are, in the case of this example, of unitary construction being made from a single piece of metal. It will however be appreciated that the brake portions 42A, 42B could be made as separate components that are fastened to the central portion 46 so as to allow the use of different materials for the central portion 46 and the brake portions 42A, 42B.

As shown in FIG. 3a, the carrier 34 extends through an opening 24 in the track 20B. The opening 24 is provided between the bottom wall 22A and the second side wall 22B of the track 20B. The brake member 42 is configured so as to engage an outer surface of the second side wall 22B so that when the brake member 42 engages the track 20B the second side wall 22B is held or gripped between the brake member 42 and one or more of the wheels 32B, 32C.

Figure 4B:
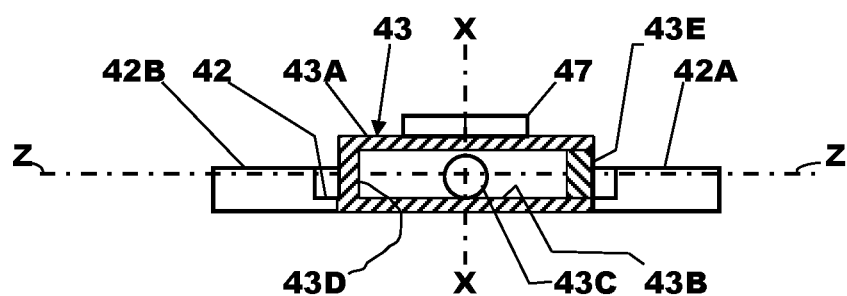

The actuator 43 is best viewed in FIG. 4b and comprises a longitudinal body 43A defining a cavity in the form of a cylindrical bore 43B in which is held captive a moveable component in the form of a heavy ball 43C. The cylindrical bore 43B is closed off at one end by an end wall 43D and is closed off at an opposite end by an end cap 43E.

The cylindrical bore 43B is arranged to mimic the orientation of the motor vehicle 10 and so is horizontally disposed when the motor vehicle 10 is resting on a level horizontal surface.

When the motor vehicle 10 is resting on an incline the cylindrical bore 43B moves to a position corresponding to the slope upon which the motor vehicle is resting and the heavy ball 43C rolls under the influence of gravity so as to rest against the end cap 43E.

When the motor vehicle 10 is resting on a decline the cylindrical bore 43B moves to a position corresponding to the slope upon which the motor vehicle 10 is resting and so the heavy ball 43C rolls under the influence of gravity so as to rest against the end wall 43D.

The movement of the heavy ball 43C causes the brake member 42 to be rotated in a direction corresponding to the displacement of the heavy ball 43C as described hereinafter with reference to FIGS. 5a to 5c. It will be appreciated that the direction in which the brake member 42 rotates is dictated by the position of the heavy ball 43C within the cylindrical bore 43B and that this position is determined by the displacement of the pivot axis X-X from the vertical and the corresponding orientation of the cylindrical bore 43B.

Figure 5A:
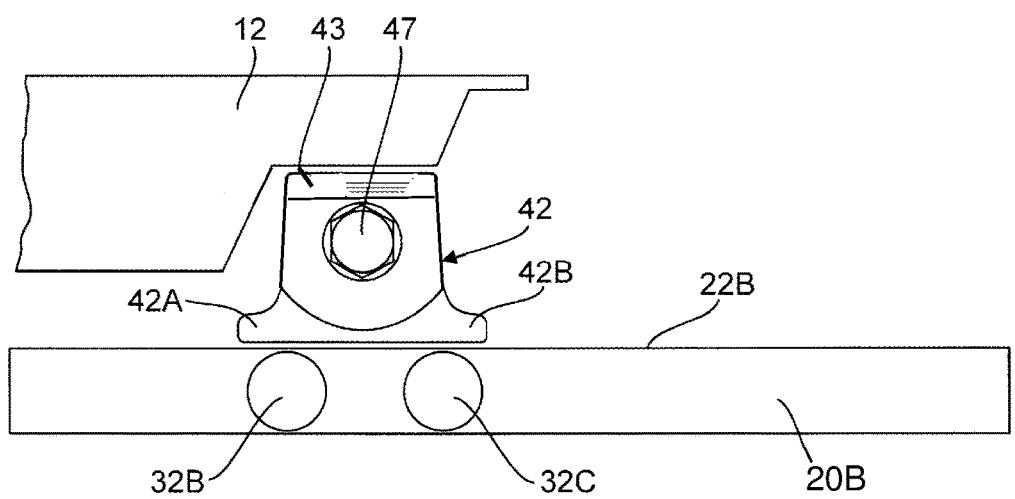
FIG. 5a is a scrap plan view showing a front part of a left-hand side door of the motor vehicle shown in FIG. 2 showing the brake member in a neutral position that it adopts when the motor vehicle is resting on a level horizontal surface.

In FIG. 5a the brake member 42 is shown in the neutral position that it adopts when the motor vehicle 10 is stationary on a level horizontal surface. The brake portions 42A, 42B and their associated brake surfaces 44A, 44B are not in contact with the side wall 22B of the track 20B and so no braking effect is applied to the sliding door 12 to which the brake member 42 is rotatably connected via the bolt 47, the carrier 34 and the intermediate member 36. The heavy ball 43C (not shown on FIG. 5a) is substantially centrally located in the cylindrical bore 43B so as to be aligned with the pivot axis X-X defined by the bolt 47 as shown in FIG. 4b.

Figure 5B:
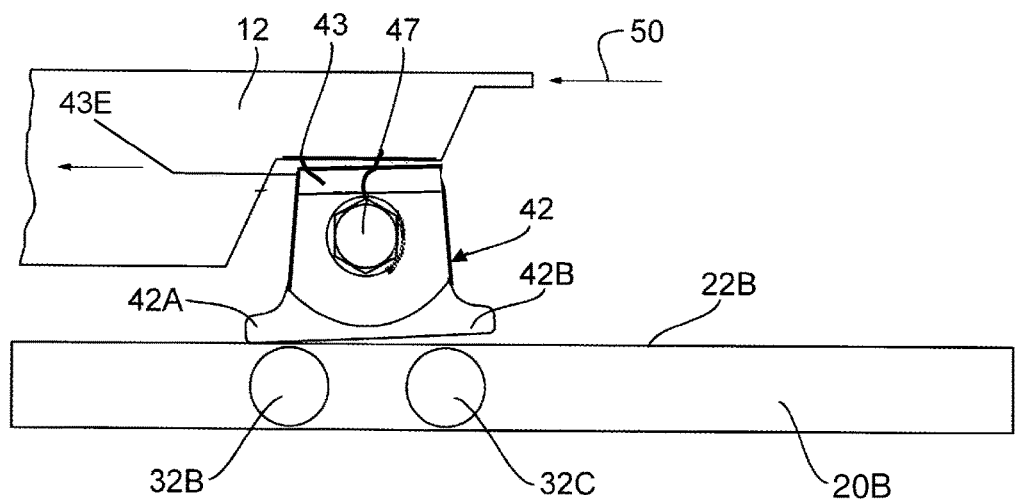
FIG. 5b is a plan view similar to FIG. 4c but showing the position the brake member adopts when the motor vehicle is resting on an incline.

In FIG. 5b the situation is shown in the case where the motor vehicle 10 is resting on an incline and the sliding door 12 is being opened as indicated by the arrow 50.

In this situation the ball 43C is displaced so as to rest against the end cap 43E thereby causing the brake member 42 to rotate so as bring the brake portion 42A and its associated brake surface 44A into contact with the track 20B. The rotation of the brake member 42 is due to the fact that the ball 43C is offset from the pivot axis X-X, the cylindrical bore 43B is no longer horizontally disposed and the pivot axis X-X is inclined to the vertical due to the orientation of the motor vehicle 10 on the incline. The contact of the ball 43C with the end cap 43E applies a force to the end cap 43E which results in a torque being applied to the brake member 42 causing it to rotate.

When the brake member 42 is in this rotational position any opening motion of the sliding door 12 will be resisted by the engagement of the brake surface 44A with the side wall 22B of the track 20B and, because the sliding door 12 is moving in a direction in which the brake portion 42A is leading, that is to say, the brake portion 42A is ahead of the pivot axis X-X of the brake member 42 then the effect is to cause the brake surface 44A to produce a self-servo effect similar to that produced by a leading shoe drum brake.

This self-servo effect increases the braking effect produced by the brake member 42 to the sliding door 12 thereby providing more resistance to the effect of gravity (the gravity force) acting in the direction of opening on the sliding door 12 due to the orientation of the motor vehicle 10. This gravity force will accelerate the sliding door 12 resulting in a potentially damaging high opening velocity of the sliding door 12.

The self-servo effect is produced because the braking surface 42A is offset from the pivot axis X-X of the brake member 42 and the brake force produced by the contact between the brake surface 44A and the side wall 22B will tend to rotate the brake member 42 in the same direction as is required to press the brake surface 44A against the side wall 22B when the door is being moved in an opening direction thereby increasing the force between the brake surface 44A and the side wall 22B.

Movement of the sliding door 12 in a closing direction while on an incline will result in the same rotational position of the brake member 42 but the brake portion 42A and its associated brake surface 44A now act as a trailing shoe brake and so no self-servo effect is produced and the braking effect of the brake member 42 on the sliding door 12 is considerably less. It will be appreciated that the effect of the gravity force on the sliding door 12 is not a problem when the motor vehicle 10 is stationary on an incline and the sliding door is being closed because the gravity force acts on the sliding door 12 against the force being applied to the sliding door 12 to close it.

Figure 5C:
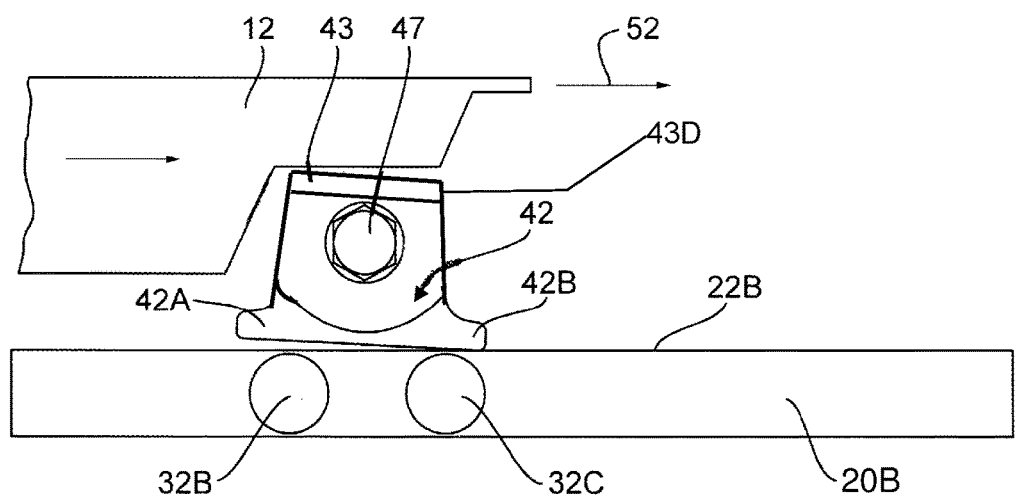
FIG. 5c is a plan view similar to FIG. 4c but showing the position the brake member adopts when the motor vehicle is resting on a decline.

In FIG. 5c the situation is shown in the case where the motor vehicle 10 is at rest on a decline and the sliding door 12 is being closed as indicated by the arrow 52.

In this situation the ball 43C is displaced so as to rest against the end wall 43D thereby causing the brake member 42 to rotate so as bring the brake portion 42B and its associated brake surface 44B into contact with the track 20B. As before, the rotation of the brake member 42 is due to the fact that the ball 43C is offset from the pivot axis X-X, the cylindrical bore 43B is no longer horizontally disposed and the pivot axis X-X is inclined to the vertical due to the orientation of the motor vehicle 10 on the incline. The contact of the ball 43C with the end wall 43D applies a force to the end wall 43D which results in a torque being applied to the brake member 42 causing it to rotate.

When the brake member 42 is in this rotated position any closing motion of the sliding door 12 will be resisted by the engagement of the brake surface 44B with the side wall 22B of the track 20B. Because the sliding door 12 is moving in a direction in which the brake portion 42B is leading, that is to say, ahead of the pivot axis of the brake member 42, the effect is to cause the brake surface 44B to produce a self-servo effect similar to that produced by a leading shoe drum brake. The self-servo effect increases the braking effect produced by the brake member 42 thereby providing more resistance to the gravity force that acts on the sliding door 12 in the direction of closing potentially causing an undesirably high closing velocity of the sliding door 12.

The self-servo effect is due to the braking surface 42B being offset from the pivot axis X-X of the brake member 42 and the brake force produced by the contact between the brake surface 44B and the side wall 22B when the sliding door 12 is being closed will act so as to try and rotate the brake member 42 in the same direction as is required to press the brake surface 44B against the side wall 22B thereby increasing the force between the brake surface 44B and the side wall 22B.

Movement of the sliding door 12 in an opening direction while on a decline will result in the same rotational position of the brake member 42 but the brake portion 42B and its associated brake surface 44B now act as a trailing shoe brake and so no self-servo effect will be produced and the braking effect of the brake member 42 on the sliding door 12 is less. It will be appreciated that the gravity force is not a problem when the motor vehicle 10 is stationary on a decline and the sliding door 12 is being opened because the gravity force acts against the force being applied to the sliding door 12 to open it.

Therefore the inclination of the motor vehicle 10 is used to automatically engage the brake member 42 in a desired manner by using the effect of gravity which in this case acts on the moveable heavy ball 43C to rotate the brake member 42 in a required direction.

The brake member 42 is therefore sensitive to vehicle orientation and automatically rotated or actuated in a manner corresponding to the slope upon which the motor vehicle 10 rests to prevent excessive acceleration of the sliding door 12 and consequential relative velocity due to the effect of gravity irrespective of whether the sliding door 12 is being opened or closed.

The brake member 42 is arranged in such a manner that it automatically adjusts to a position to provide a larger braking force to the sliding door 12 when direction of travel of the sliding door 12 is the same as the direction in which the force of gravity acts upon the sliding door 12 due to the inclination of the motor vehicle 10 than it produces when the sliding door 12 is moved in an opposite direction of travel to the direction in which the force of gravity acts upon the sliding door 12 due to the inclination of the motor vehicle 10.

Figure 4C:
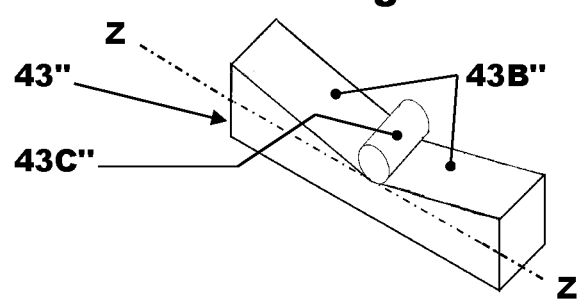
FIG. 4c is a scrap pictorial view of an alternative actuator for a sliding door brake member.

In FIG. 4c there is shown part of an actuator 43" that is intended as a direct replacement for the actuator 43 shown in FIG. 4b.

Instead of using a heavy ball 43C, a heavy roller 43C" is used and instead of using a flat surface upon which the ball 43C rolls a V-shaped surface having a pair of sloping surfaces 43B" are used to support the roller 43C". The actuator 43" is orientated such that a longitudinal axis Z-Z is arranged horizontally when the motor vehicle rests upon a level horizontal surface. The angle of each of the sloping surfaces 43B" is greatly exaggerated on FIG. 4c to ease understanding and in practice an angle of only 1 or 2 degrees to the axis Z-Z would be used. The V-shape surface formed by the pair of sloping surfaces 43B" assists with centralizing of the roller 43C" when the motor vehicle is on a substantially horizontal surface. It will be appreciated that the V-shaped surface of FIG. 4c could be used with a ball instead of a roller. It will be further appreciated that the actuator 43" would in practice have means provided to hold the roller 43C" captive on the V-shaped surface during use.

Figure 6A:
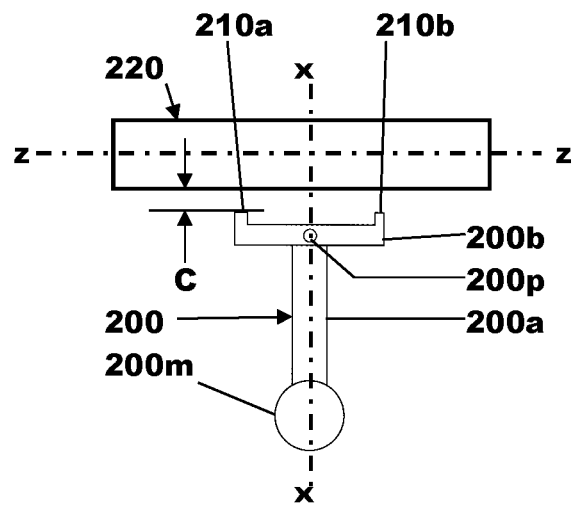
FIG. 6a shows in a diagrammatic form a second embodiment of a brake mechanism having a rotatable brake member showing a neutral position that the brake member adopts when a vehicle of which the brake mechanism forms a part is resting on a level horizontal surface.
Figure 6B:
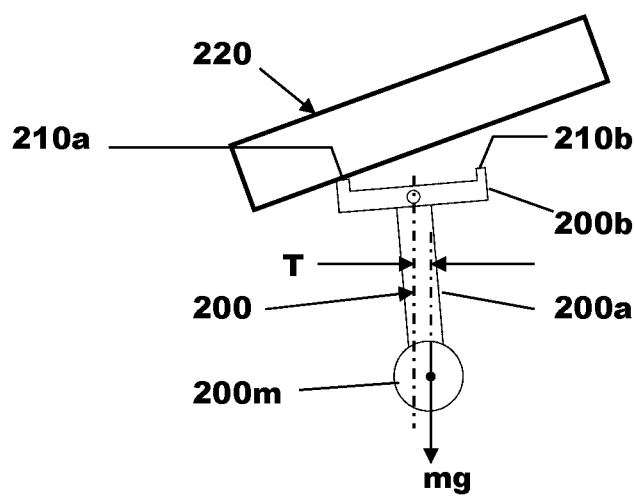
FIG. 6b shows the brake member shown in FIG. 6a in an engaged position that it adopts when the vehicle is on an incline.

With particular reference to FIGS. 6a and 6b there is shown an alternative embodiment of a sliding door braking mechanism 200 that is intended as a replacement for the brake mechanism 40 previously described.

The braking mechanism 200 comprises a brake member 200b pivotally connected to a sliding door (not shown) such as the sliding door 12 via a pivot pin 200p and an actuator member 200m in the form of a heavy mass connected to the brake member 200b via a rod or attachment arm 200a.

The brake member 200b defines two brake surfaces 210a and 210b for frictional engagement with a support track 220 fastened to part of a body structure of a motor vehicle such as the motor vehicle 10. Each of the braking surfaces 210a, 210b is spaced a distance "C" from a lower side of the track 220 when the motor vehicle is resting on a horizontal surface. The track 220 is arranged to extend along a side of the body vehicle such that a longitudinal axis z-z of the track 220 is horizontally disposed when the motor vehicle is resting upon a horizontal surface.

The braking member 200 has a longitudinal axis x-x that is arranged vertically when the motor vehicle is resting on a horizontal surface.

In FIG. 6b the motor vehicle is resting on a decline so that the track 220 is at an angle to the horizontal. In the case of this example a closing motion of the sliding door will move the braking mechanism 200 in a right to left direction and an opening motion of the sliding door will move the attached braking mechanism 200 in a left to right direction.

Due to the inclination of the motor vehicle the track 220 and the brake member 200 have come into contact with one another such that the brake surface 210a is abutting against the lower surface of the track 220 and the brake member has been rotated slightly from the vertical orientation shown in FIG. 6a. It will be appreciated that the actuator member 200m will always try and hang vertically below the pivot pin 200p. The displacement of the brake member 200b from the position shown in FIG. 6a causes a force to be applied to the track 220 by the brake surface 210a due to a resulting offset T of a center of gravity of the actuator member 200m from a vertical plane passing through the pivot pin 200p and the effect of gravity on the actuator member 200m producing a force in the direction of the arrow 'mg' passing through the center of gravity of the actuator member 200m. It will be appreciated that a force will also be produced by the displacement of the attachment arm 200a.

Therefore in the case when the sliding door is being closed the brake surface 210a will act in a similar manner to a leading shoe brake so as to reduce unwanted acceleration of the sliding door and will also produce a self-servo effect due to the leading offset position of the brake surface 210a relative to the pivot pin 200p and the direction in which the sliding door is moving.

If the sliding door is moved in an opening direction no self-servo effect is produced due to the direction in which the sliding door is moving and the fact that the brake surface 210a is then acting as a trailing shoe brake.

It will be appreciated that if the vehicle is resting upon an incline then an opposite operational condition would be produced in which the brake surface 210b would act in a similar manner to a leading shoe brake to reduce unwanted or excessive acceleration when the sliding door is opened by frictional contact with the lower surface of the track 220 and the brake surface 210b would act as a trailing shoe brake when the sliding door is closed.

Therefore in summary a simple and economical brake mechanism for braking a sliding door of a motor vehicle is provided that automatically adjusts based upon the orientation of the motor vehicle to provide a braking force to the sliding door to prevent excessive door velocity irrespective of whether to sliding door is being opened or closed.

Although the brake mechanism has been described with respect to a manual rear opening sliding side door it will be appreciated that it could also be applied to a manual front opening sliding side door.

Although the brake mechanism has been described with reference to a preferred embodiment in which the brake member engages a sliding door support track used to slidingly support the sliding door, it will be appreciated that the brake member could be engageable with an elongate track provided solely for the purpose of providing a braking force to the sliding door.

Although the brake mechanism has been described with respect to an arrangement in which three guide tracks are provided to support the sliding door, it will be appreciated that any number of guide tracks may be provided and that more than one brake mechanism may be provided. For example, in the case of a sliding door having top, bottom and middle guide tracks, three braking mechanisms could be provided a respective one co-operating with each of the guide tracks.

It will be appreciated by those skilled in the art that although the brake mechanism has been described by way of example with reference to one or more examples, it is not limited to the disclosed examples and that alternative examples may be constructed without departing from the scope of the brake mechanism and vehicle as defined by the appended claims.

What is claimed:

1. A vehicle having an elongate track extending longitudinally along a side of the vehicle, a sliding door manually slideable between closed and open positions and a sliding door brake mechanism for selectively applying a braking force to the sliding door, the sliding door brake mechanism comprising a brake member pivotally connected to the sliding door of the vehicle for rotation about a pivot axis and having a brake surface located between the pivot axis of the brake member and the adjacent elongate track, wherein when said vehicle is on a slope the brake member is automatically rotated under the influence of gravity about the pivot axis between a neutral position in which there is no contact between the brake surface and the elongate track and an engaged position in which the brake surface abuts against the elongate track so as to provide the braking force to the sliding door.

2. The vehicle as claimed in claim 1 wherein the brake member comprises a pair of spaced apart brake surfaces located on opposite sides of a plane aligned with and extending from the pivot axis to the elongate track.

3. The vehicle as claimed in claim 2 wherein a first brake surface is positioned between the plane and a rear end of the sliding door and the first brake surface is automatically brought into engagement with the elongate track when the vehicle is on an incline.

4. The vehicle as claimed in claim 3 wherein the braking force produced by the engagement of the first brake surface with the elongate track produces a self-servo effect when the sliding door is moved in a door opening direction while the vehicle is on the incline.

5. The vehicle as claimed in claim 3 wherein a second brake surface is positioned between the plane and a front end of the sliding door and the second brake surface is automatically brought into engagement with the elongate track when the vehicle is on a decline.

6. The vehicle as claimed in claim 5 wherein the braking force produced by the engagement of the second brake surface with the elongate track produces a self-servo effect when the sliding door is moved in a door closing direction while the vehicle is on the decline.

7. The vehicle as claimed in claim 5 wherein the brake member includes an actuator having a moveable component a position of which is dependent upon an orientation of the vehicle and the moveable component is spaced away from the pivot axis of the brake member on an opposite side of the pivot axis to the position of the first brake surface and the second brake surface so that movement of the moveable component provides a force to the brake member to cause the brake member to rotate about the pivot axis in a direction corresponding to the orientation of the vehicle.

8. The vehicle as claimed in claim 7 wherein the actuator has a body defining a cavity and the moveable component is one of a ball and a roller held captive in the cavity in the body of the actuator.

9. The vehicle as claimed in claim 8 wherein the body of the actuator is formed as a unitary part of the brake member.

10. The vehicle as claimed in claim 9 wherein the elongate track is a sliding door support track extending longitudinally along the side of the vehicle and the sliding door is manually moveable along the sliding door support track between the closed position and the open position.

11. The vehicle as claimed in claim 10 wherein the brake member is pivotally connected to the sliding door via a carrier forming part of a sliding door support mechanism.

12. The vehicle as claimed in claim 11 wherein the sliding door support mechanism further comprises one or more wheels rotatably connected to the carrier for engaging the sliding door support track and the brake member is positioned such that a portion of the sliding door support track is interposed between the brake member and the one or more of the wheels.

13. The vehicle as claimed in claim 12 wherein each brake surface is formed on a brake portion of the brake member and each brake portion is formed as a unitary part of the brake member.

14. The vehicle as claimed in claim 13 wherein the pivot axis of the brake member is arranged substantially vertically when the vehicle rests upon a level horizontal surface.

15. The vehicle as claimed in claim 14 wherein the direction in which the brake member rotates when the vehicle is on the slope is related to the direction in which the pivot axis is displaced from vertical due to the vehicle resting on the slope.

* * * * *